No. 791,880. PATENTED JUNE 6, 1905.
A. G. M. COMBEE.
CHECK ROW COTTON THINNER.
APPLICATION FILED MAR. 2, 1905.
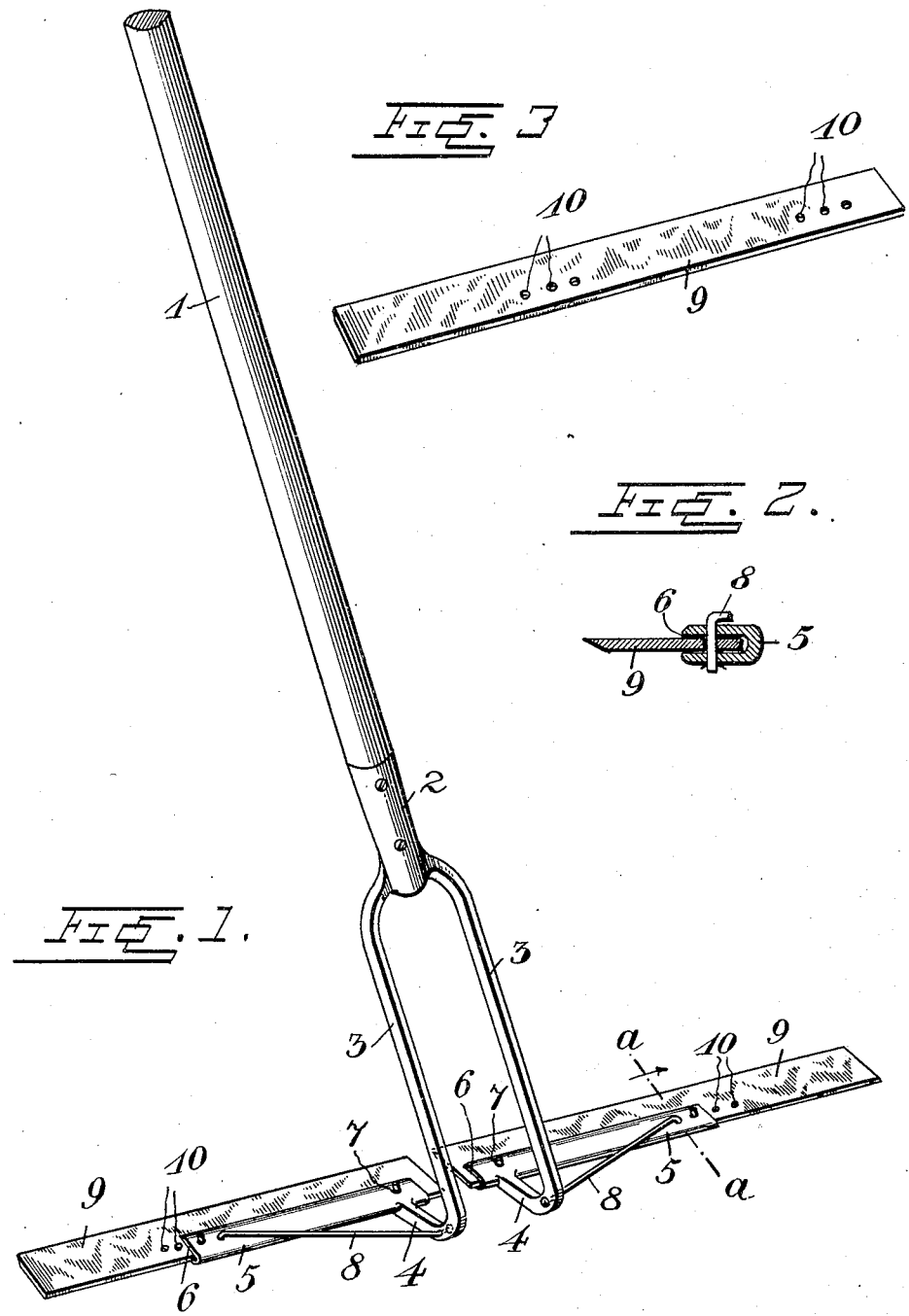
Witnesses
C. Meuston
C. H. Griesbauer
Inventor
Augustus G. M. Combee
by H. B. Willson
Attorney No. 791,880.	Patented June 6, 1905.

UNITED STATES PATENT OFFICE.

AUGUSTUS G. M. COMBEE, OF ROME, GEORGIA.

CHECK-ROW COTTON-THINNER.

SPECIFICATION forming part of Letters Patent No. 791,880, dated June 6, 1905.

Application filed March 2, 1905. Serial No. 248,117.

*To all whom it may concern:*

Be it known that I, AUGUSTUS G. M. COMBEE, a citizen of the United States, residing at Rome, in the county of Floyd and State of Georgia, have invented certain new and useful Improvements in Check-Row Cotton-Thinners; and I do declare the following to be a full, clear, and exact description of the invention, such as will enable others skilled in the art to which it appertains to make and use the same.

My invention is an improved check-row cotton-thinning hoe adapted for use across rows of cotton-plants for reducing them to "stands" and disposing the stands in check-rows, so that the growing plants may be cultivated both ways; and my invention consists in the construction, combination, and arrangement of devices hereinafter described and claimed.

In the accompanying drawings, Figure 1 is a perspective view of a check-row cotton-thinning hoe embodying my improvements. Fig. 2 is a detail transverse sectional view of the same, taken on the plane indicated by the line *a a* of Fig. 1; and Fig. 3 is a detail perspective view of one of the blades.

To one end of a handle 1 is secured a head 2, which is provided with a pair of bars 3, that are spaced apart an appropriate distance, are parallel with each other, or substantially so, are turned downwardly, as at 4, and then turned outwardly to form laterally-extending alining arms 5. The said arms are slotted on their under sides, as at 6, the said slots extending from the outer to the inner ends of the said arms, and the latter are provided at suitable points with openings 7. The outer end of each arm 5 is connected to the downturned portion 4 of its arm 3 by means of a brace-rod 8. Said brace-rods, as will be understood, greatly strengthen the said arms and enable them to withstand the stress to which they are subjected when the implement is in use.

A pair of blades 9 are employed with the implement, each of which blades is a straight blade of suitable length, breadth, and thickness. The upper edge of each blade is placed in the slot 6 of one of the arms 5. The inner ends of the blades are suitably spaced apart, so that they will clear the plant and leave the same to form a stand. The outer portions of the blades project beyond the outer ends of the arms 5. The blades are provided with openings 10, some of which when the blades are adjusted register with the openings 7. Suitable rivets or pins are placed in said registering openings and serve to detachably and adjustably secure the blades in place.

In the use of my improved implement the same is employed to chop across the rows, so as to destroy the superfluous plants and leave the stands in check-rows.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A check-row cotton-thinning implement for manual use, having a head provided with a pair of forwardly-extending laterally-spaced bars bent to form downturned portions 4, and outturned transverse alined arms 5, said arms being integral with said bars and disposed transversely with reference to said head, relatively long and narrow blades, detachably secured to said arms and adjustable toward and from each other to vary the width of the space between them, and braces connecting the said arms to the said bars, substantially as described.

In testimony whereof I have hereunto set my hand in presence of two subscribing witnesses.

AUGUSTUS G. M. COMBEE.

Witnesses:
 H. H. RICHARDS,
 RAY G. STEWART.